(12) United States Patent
Kwon et al.

(10) Patent No.: US 9,794,323 B2
(45) Date of Patent: Oct. 17, 2017

(54) METHOD AND APPARATUS FOR PERFORMING OBJECT TRANSFER SERVICE USING BLUETOOTH LOW ENERGY IN WIRELESS COMMUNICATION SYSTEM

(71) Applicant: LG ELECTRONICS INC., Seoul (KR)

(72) Inventors: Younghwan Kwon, Seoul (KR); Minsoo Lee, Seoul (KR); Jingu Choi, Seoul (KR); Jaeho Lee, Seoul (KR); Hyeonjae Lee, Seoul (KR); Jangwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/118,774

(22) PCT Filed: Jun. 5, 2014

(86) PCT No.: PCT/KR2014/004999
§ 371 (c)(1),
(2) Date: Aug. 12, 2016

(87) PCT Pub. No.: WO2015/122576
PCT Pub. Date: Aug. 20, 2015

(65) Prior Publication Data
US 2017/0054787 A1 Feb. 23, 2017

Related U.S. Application Data

(60) Provisional application No. 61/939,199, filed on Feb. 12, 2014, provisional application No. 61/942,034, filed on Feb. 20, 2014.

(51) Int. Cl.
*H04B 7/00* (2006.01)
*H04L 29/08* (2006.01)
(Continued)

(52) U.S. Cl.
CPC ............ *H04L 67/06* (2013.01); *H04W 4/008* (2013.01); *H04W 8/005* (2013.01); *H04W 76/02* (2013.01); *H04W 76/064* (2013.01)

(58) Field of Classification Search
CPC ..... H04W 4/008; H04W 8/005; H04W 76/02; H04L 67/06; H04M 1/7253
(Continued)

(56) References Cited

U.S. PATENT DOCUMENTS 8,554,141 B2   10/2013  Desai et al.
2009/0017798 A1  1/2009  Pop
(Continued)

FOREIGN PATENT DOCUMENTS

KR      10-1355058 B1    1/2014

*Primary Examiner* — Eugene Yun
(74) *Attorney, Agent, or Firm* — Birch, Stewart, Kolasch & Birch, LLP

(57) ABSTRACT

Disclosed herein is a method for performing communication using Bluetooth low energy (BLE) in a wireless communication system including a server device and a client device. The client device receives object changed indication information including object identification information indicative of a changed object from the server device. The object identification information includes the name of the changed object or the identifier (ID) of the changed object.

13 Claims, 12 Drawing Sheets

(51) Int. Cl.
*H04W 76/06* (2009.01)
*H04W 4/00* (2009.01)
*H04W 8/00* (2009.01)
*H04W 76/02* (2009.01)

(58) Field of Classification Search
USPC .......................................................... 455/41.2
See application file for complete search history.

(56) References Cited

U.S. PATENT DOCUMENTS

| | | |
|---|---|---|
| 2012/0052802 A1 | 3/2012 | Kasslin et al. |
| 2012/0142271 A1 | 6/2012 | Zhodzishsky et al. |
| 2013/0017816 A1 | 1/2013 | Talty et al. |
| 2015/0032547 A1* | 1/2015 | Malhotra ............ G06Q 30/0267 705/14.64 |

\* cited by examiner

[Figure 1]
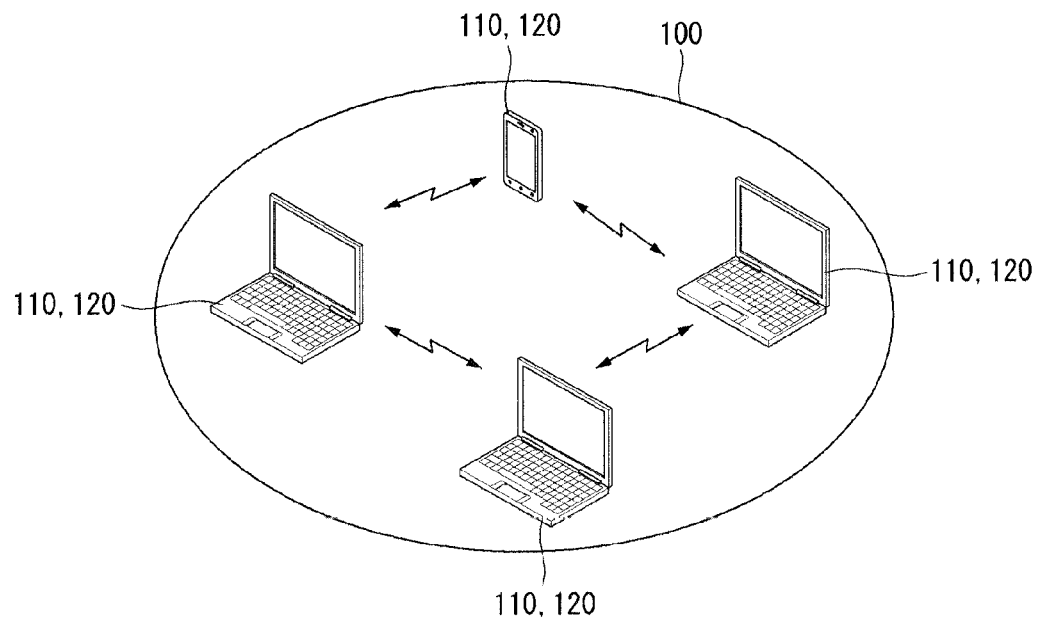

[Figure 2]
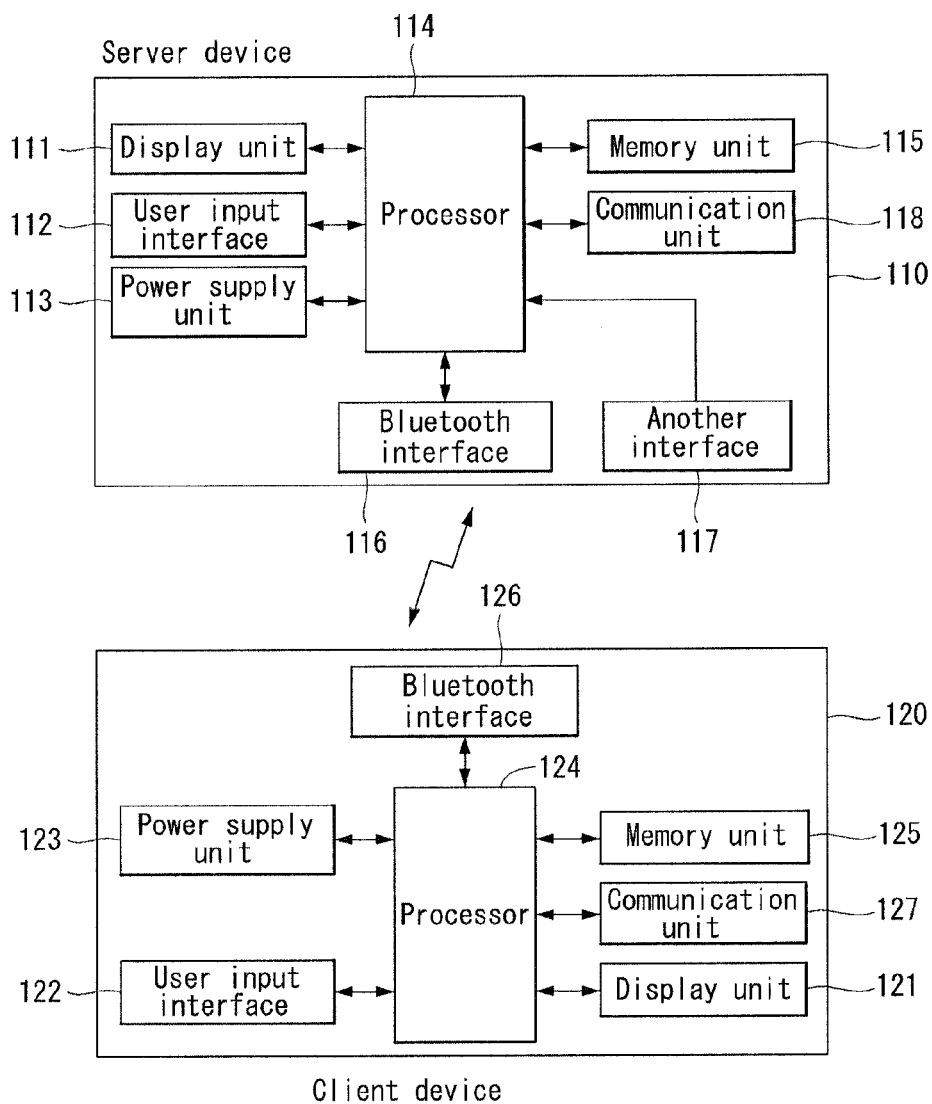

[Figure 3]
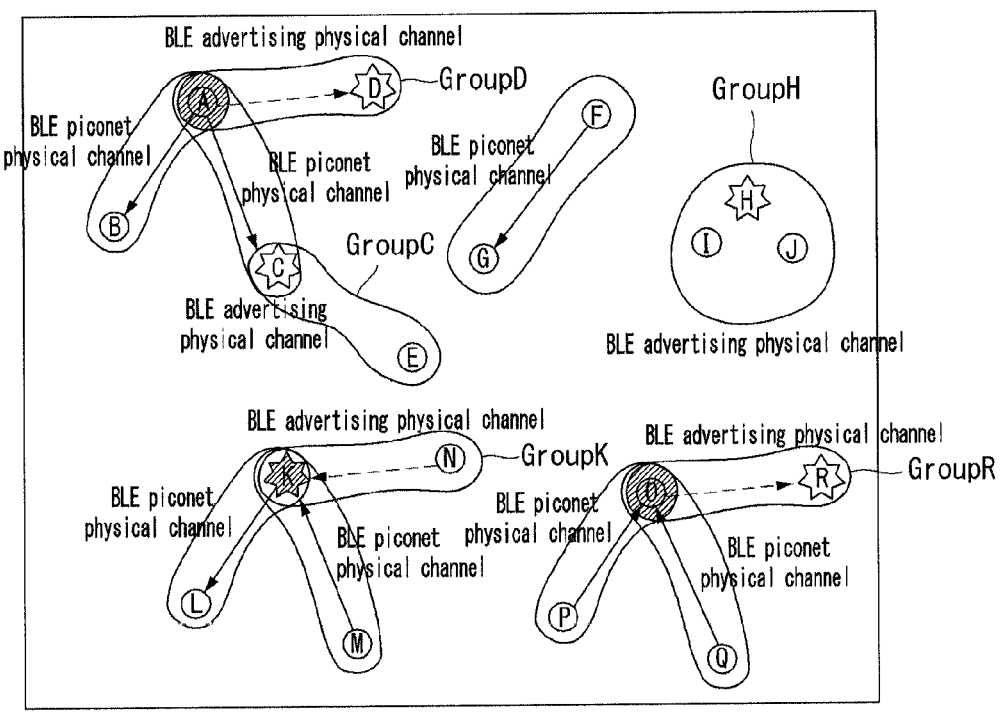

[Figure 4]
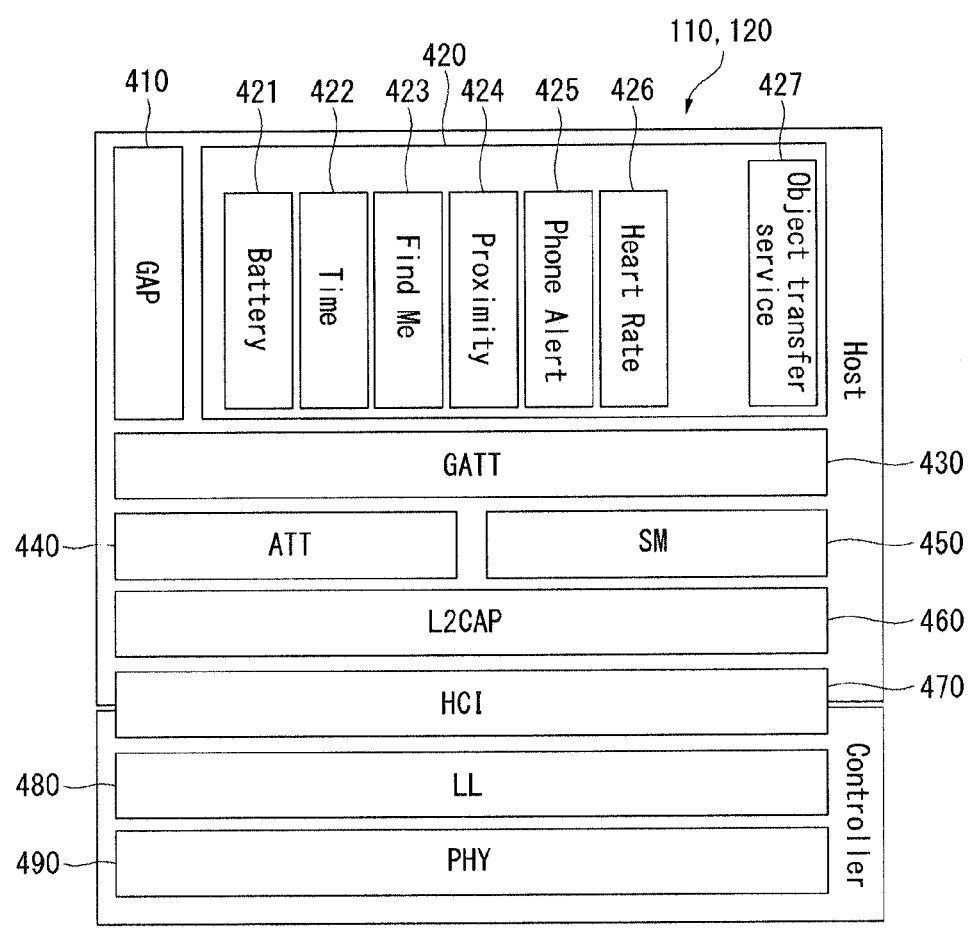

【Figure 5】
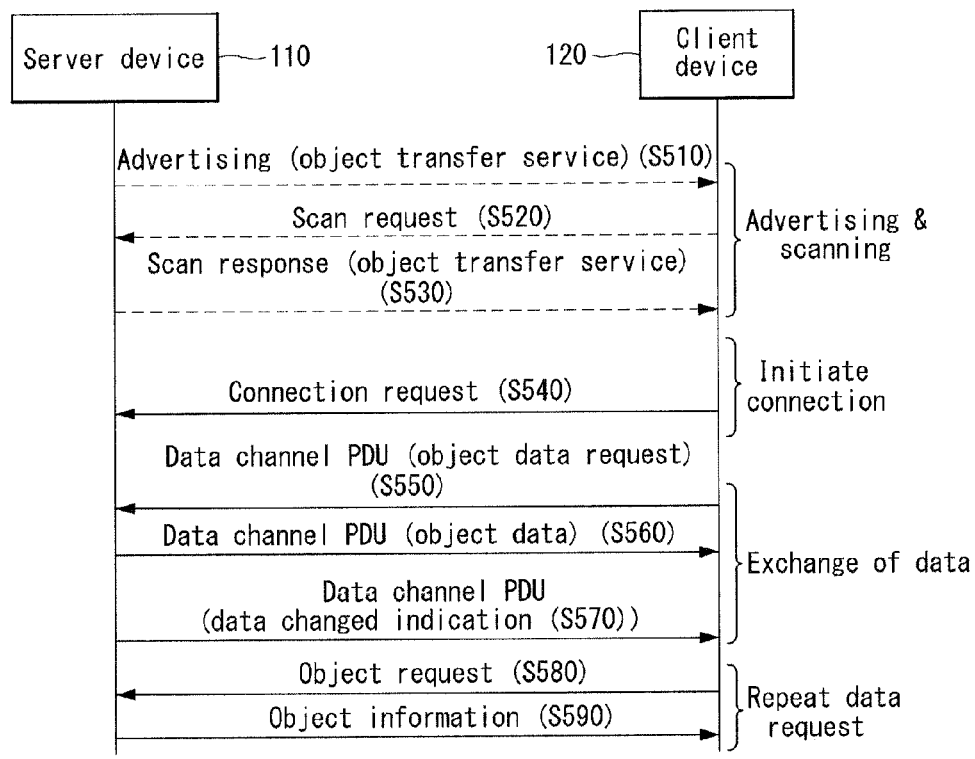
【Figure 6】
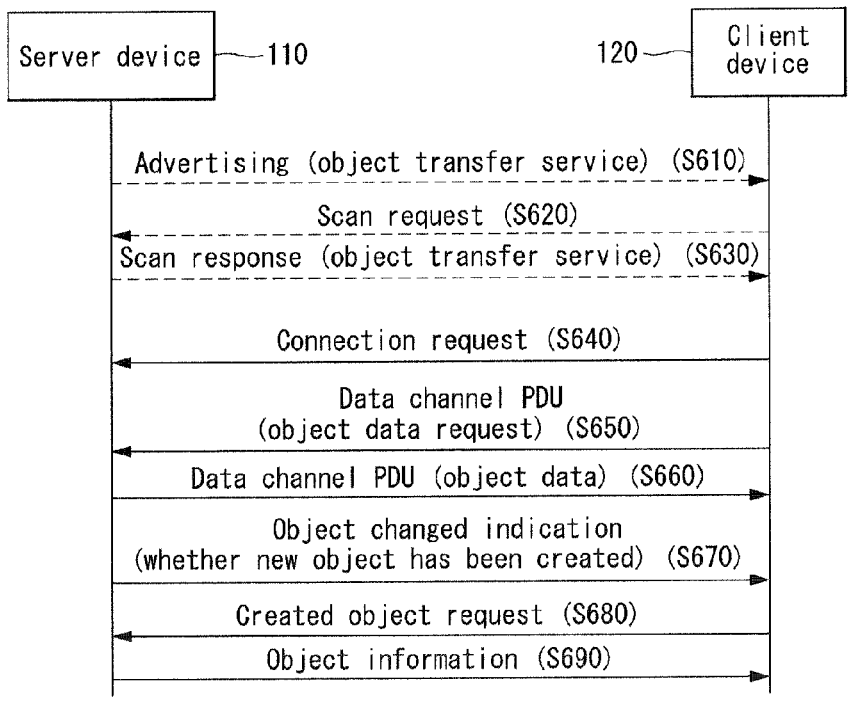

[Figure 7]
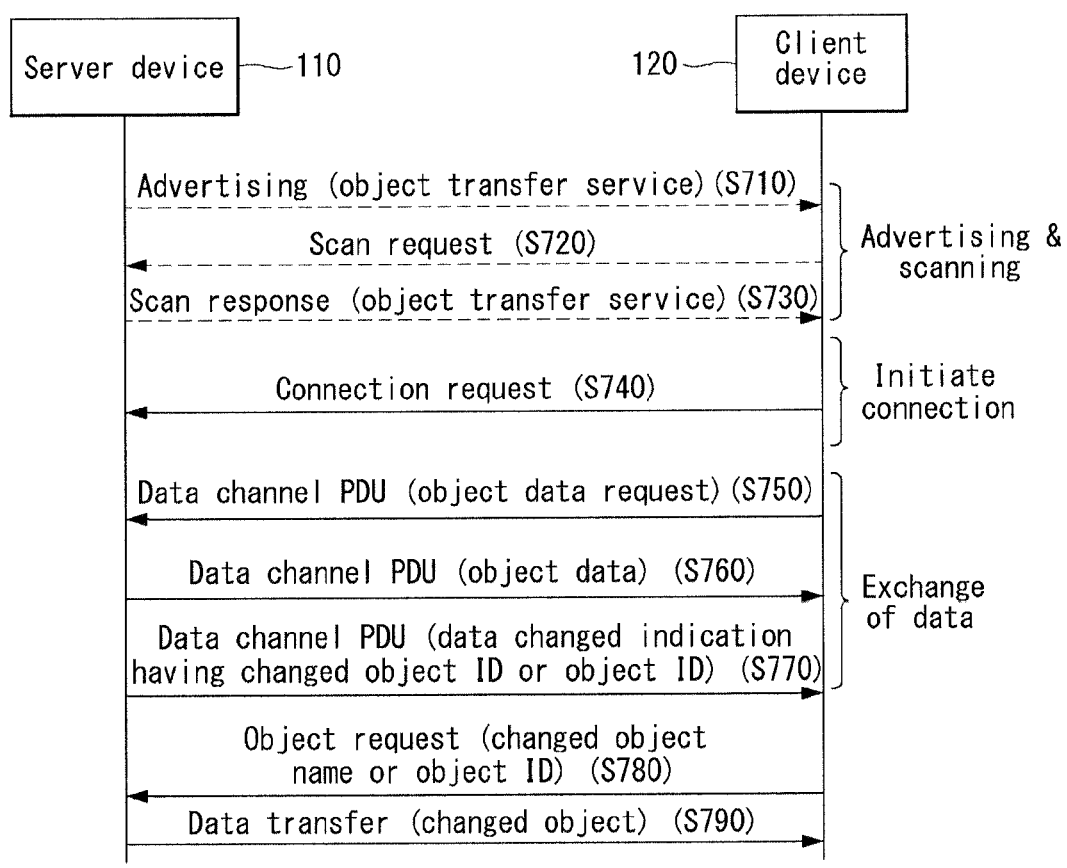

[Figure 8]
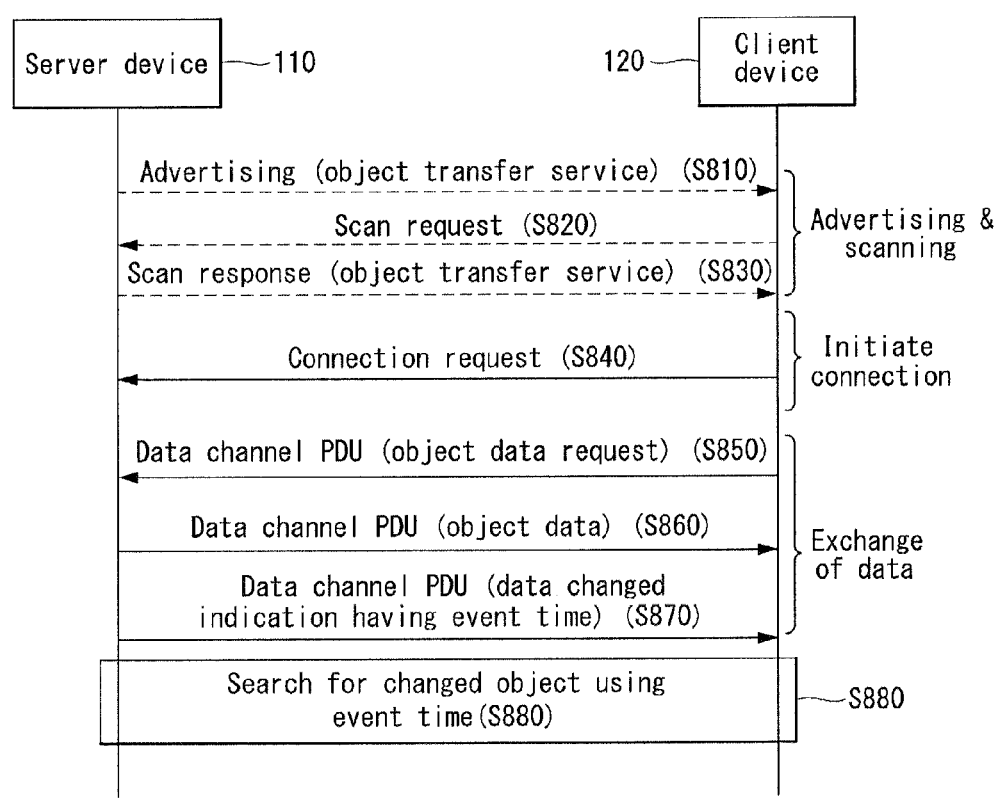

[Figure 9]
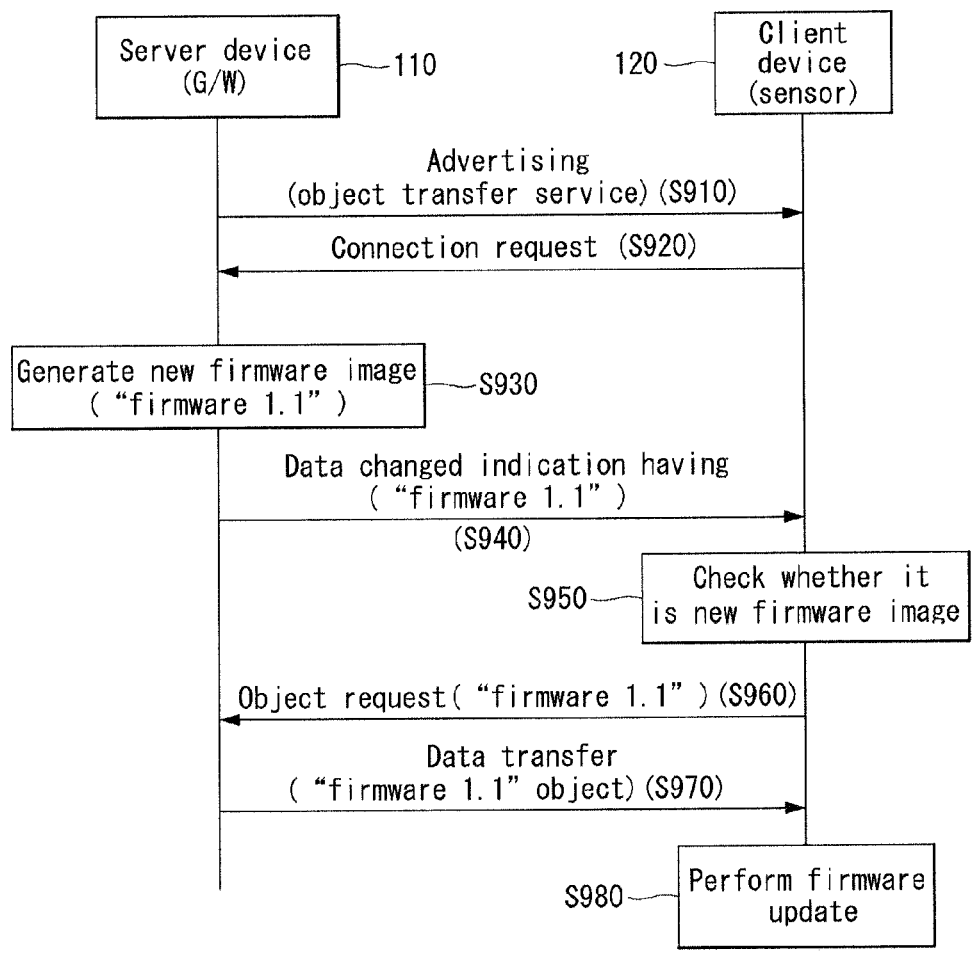

【Figure 10】
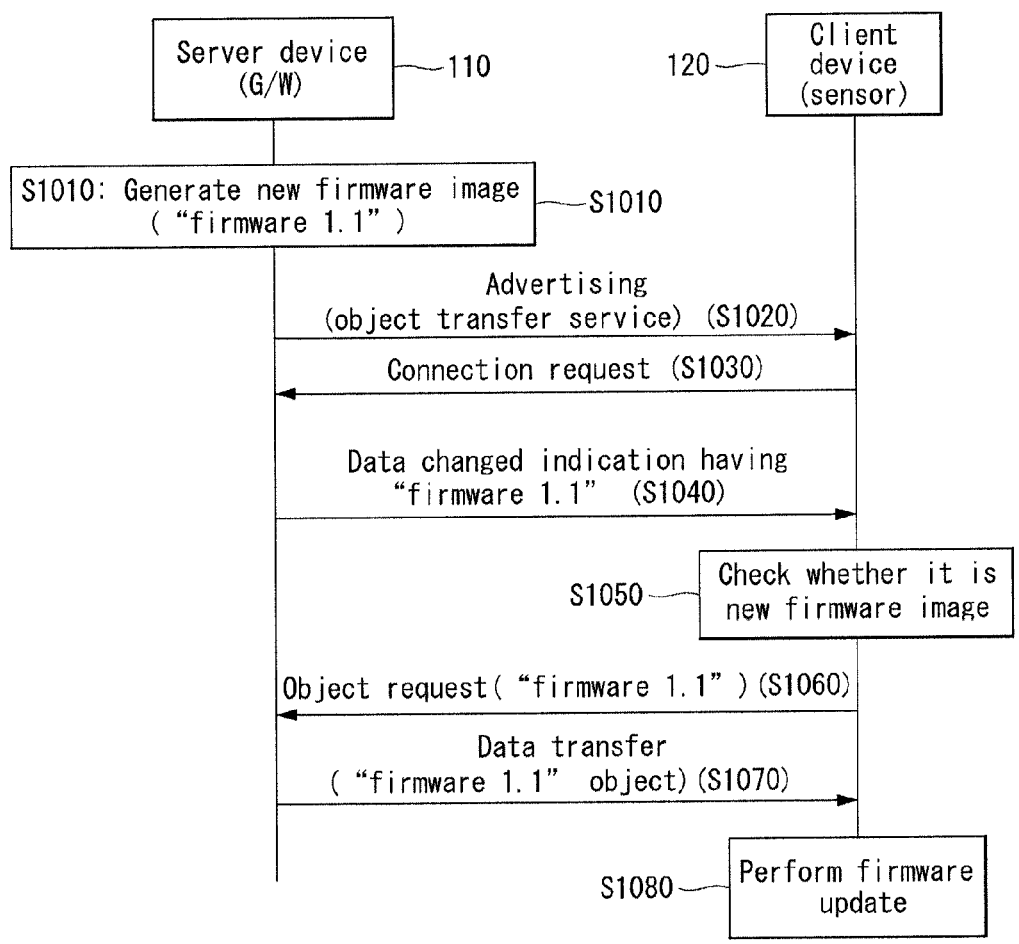

[Figure 11]
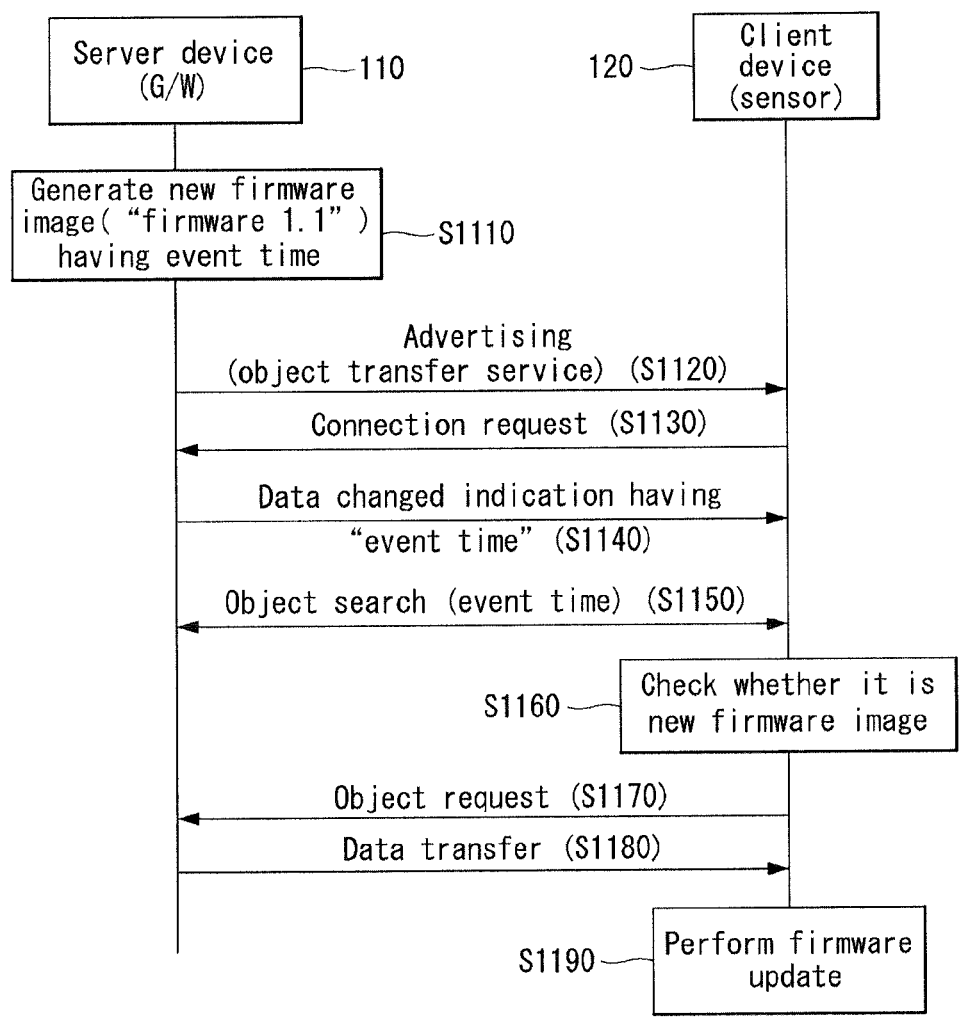

【Figure 12】
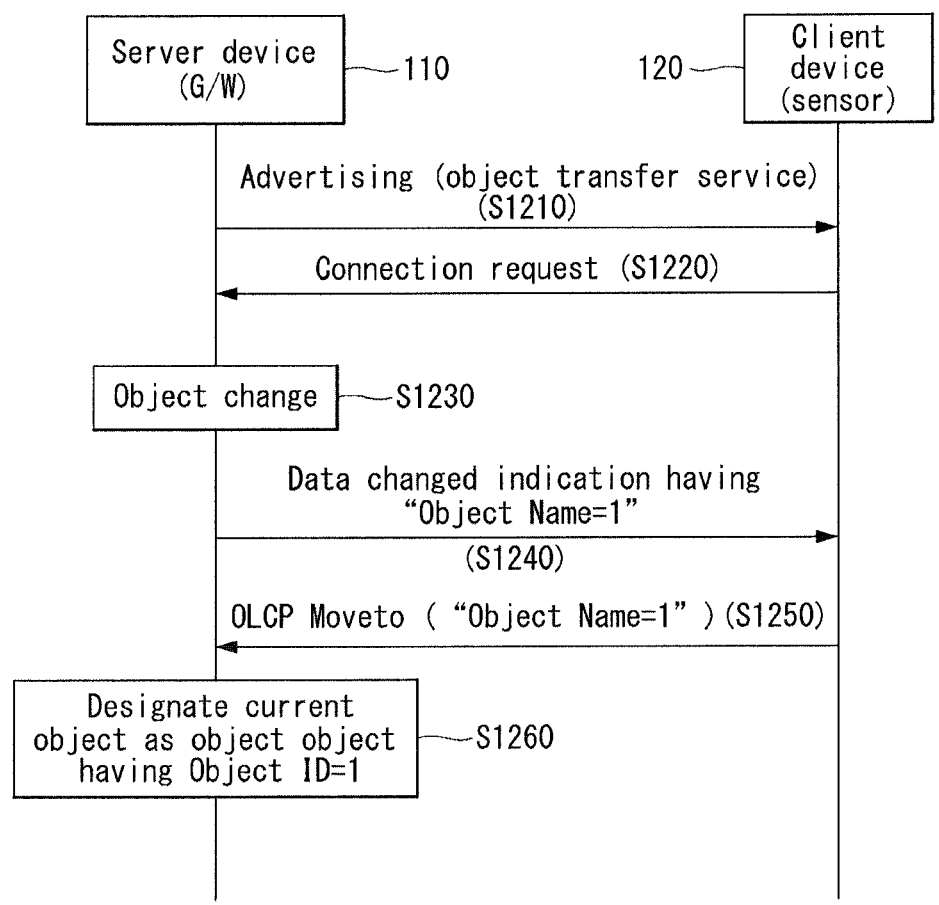

[Figure 13]
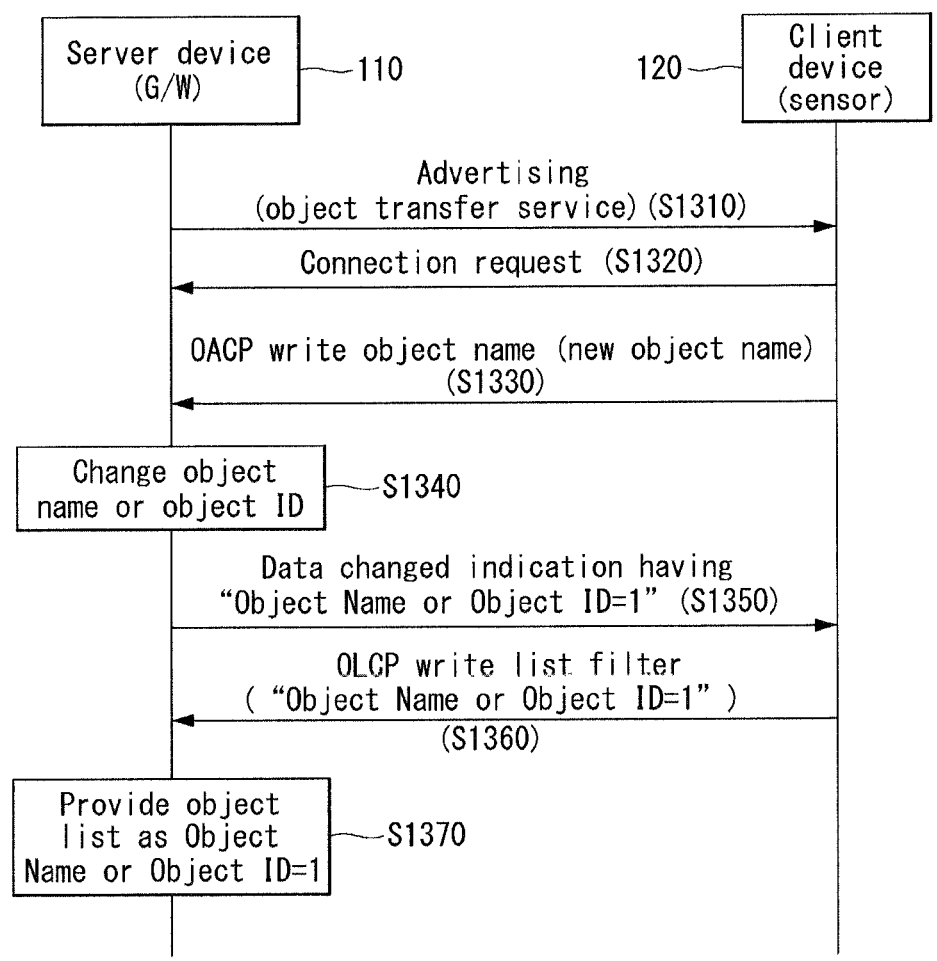

METHOD AND APPARATUS FOR PERFORMING OBJECT TRANSFER SERVICE USING BLUETOOTH LOW ENERGY IN WIRELESS COMMUNICATION SYSTEM

CROSS REFERENCE TO RELATED APPLICATIONS

This application is the National Phase of PCT/KR2014/004999 filed on Jun. 5, 2014, which claims priority under 35 U.S.C. §119(e) to U.S. Provisional Application Nos. 61/939,199 filed on Feb. 12, 2014; and 61/942,034 filed on Feb. 20, 2014, all of which are hereby expressly incorporated by reference into the present application.

TECHNICAL FIELD

This specification relates to a method for transmitting data or object-related data using Bluetooth low energy (BLE), that is, a short-distance low energy wireless technology.

BACKGROUND ART

Bluetooth is one of representative short-distance wireless technologies in which various devices (e.g., a smart phone, a PC, an earphone, and a headphone) are interconnected to exchange information. Furthermore, Bluetooth is a technology applied to most of smart phones, PCs, and notebooks, which allows many people to easily use Bluetooth. The pairing procedure of Bluetooth stably provides connectivity between devices. A recent LE technology can stably provide information of several hundreds of KB while consuming low power.

If such a BLE technology is used, low power is wasted and data can be transmitted easily and stably. In BLE, in order to overcome the limits of characteristic data transmission, an object-based transmission method is necessary. In the object-based transmission method, a server manages data. When data managed by the server is changed, another device (or equipment) needs to be notified of such a change (if several data is present, another device (or equipment) needs to be clearly notified of the presence of such data). In the current BLE technology, such a method is not clear.

Accordingly, an addition task for clearly providing notification that what object-related data or what data has been modified and for searching for changed object-related data or changed data is required.

DISCLOSURE

Technical Problem

This specification is directed to the provision of a method for controlling the transmission of bulk data having a size of several hundreds of bytes or more by providing an object transfer service in a BLE technology.

Furthermore, this specification is directed to the provision of a method for managing an object or data between devices by transmitting information indicative of a created object or data when the new object or data is created.

Furthermore, this specification is directed to the provision of a method for managing an object or data between devices by transmitting information to identify a changed object or data when the object or data is changed.

Furthermore, this specification is directed to the provision of a method for managing an object or data between devices by transmitting the event time of a changed object or data when the object or data is changed.

Furthermore, this specification is directed to the provision of a method for performing object list filtering using an object ID.

Furthermore, this specification is directed to the provision of a method for designating a current object through a movement from an object list control point (OLCP) to a specific object in an object list.

Furthermore, this specification is directed to the provision of a method for changing the marking value of an object.

Technical Solution

This specification provides a method for performing communication using Bluetooth low energy (BLE) in a wireless communication system including a server device and a client device. The method performed by the client device includes receiving an advertising message including object transfer service-related information from the server device, transmitting a scan request message for obtaining additional information to the server device, receiving a scan response message from the server device as a response to the scan request, transmitting a connect request message to the server device in order to establish a Bluetooth communication connection with the server device, and receiving object changed indication information including object identification information indicative of a changed object from the server device. The object identification information includes the name of the changed object or the identifier (ID) of the changed object.

Furthermore, in this specification, the object changed indication information further includes generation flag information indicating whether a new object or data has been created.

Furthermore, in this specification, the method further includes transmitting an object request message to the server device in order to request the object corresponding to the object identification information from the server device.

Furthermore, in this specification, the method further includes receiving object filter information including an object list of only objects marked by a marking type indicative of object characteristics from the server device.

Furthermore, in this specification, the method further includes transmitting operation code (Op code) information indicating a change of a marked object value of an object list to the server device.

Furthermore, in this specification, object list control point (OLCP) information includes the Op code information indicative of a movement to an object having a specific object ID of the object list.

Furthermore, in this specification, the object changed indication information further includes event generation time information indicative of a time when a change of an object is generated.

Furthermore, in this specification, the method further includes searching for the changed object based on the received event generation time information.

Furthermore, this specification provides a client device performing communication with a server device using Bluetooth low energy (BLE) in a wireless communication system, including a communication unit configured to perform communication with an outside in a wireless or wired manner and a processor operatively connected to the communication unit. The processor controls the communication unit so that the communication unit receives an advertising message including object transfer service-related information from the server device, controls the communication unit so that the communication unit sends a scan request message for obtaining additional information to the server device and receives a scan response message from the server device as a response to the scan request, controls the communication unit so that the communication unit sends a connect request message to the server device in order to establish a Bluetooth communication connection with the server device, and controls the communication unit so that the communication unit receives object changed indication information including object identification information indicative of a changed object from the server device. The object identification information includes the name of the changed object or the identifier (ID) of the changed object.

Furthermore, in this specification, the processor controls the communication unit so that the communication unit receives object filter information including an object list of only objects marked by a marking type indicative of object characteristics from the server device.

Furthermore, in this specification, the processor controls the communication unit so that the communication unit sends operation code (Op code) information indicating a change of a marked object value of an object list to the server device.

Furthermore, in this specification, object list control point (OLCP) information includes the Op code information indicative of a movement to an object having a specific object ID of the object list.

Furthermore, this specification provides a method for performing communication using Bluetooth low energy (BLE) in a wireless communication system including a server device and a client device. The method performed by the server device includes transmitting (or sending) an advertising message including object transfer service-related information to the client device, receiving a scan request message for obtaining additional information from the client device, transmitting a scan response message to the client device as a response to the scan request, receiving a connect request message from the client device in order to establish a Bluetooth communication connection with the client device, and transmitting object changed indication information including object identification information indicative of a changed object to the client device. The object identification information includes the name of the changed object or the identifier (ID) of the changed object.

Furthermore, in this specification, the Op Code information is included in object list control point (OLCP) information or object action control point (OACP) information and transmitted.

Advantageous Effects

In this specification, bulk data, such as a file, can be efficiently transmitted in a smart phone and various devices because an object transfer service is provided in the BLE technology.

Furthermore, this specification has an advantage in that a calculation process for searching for, by a client device, a created or changed object (or data) because a server device immediately notifies the client device of the created or changed object when the object is created or changed in the server device.

Furthermore, this specification has advantages in that a load of a server and a client device can be reduced and power consumption of the device can be reduced because a calculation process for searching for, by a client device, a created or changed object is reduced.

DESCRIPTION OF DRAWINGS

FIG. 1 is a schematic diagram showing an example of a wireless communication system using a BLE technology proposed in this specification.

FIG. 2 shows an example of the internal configurations of a server device and a client device, which is proposed in this specification.

FIG. 3 shows an example of a BLE topology.

FIG. 4 shows an example of BLE architecture proposed in this specification.

FIG. 5 is a diagram showing an example of a method for providing an object transfer service in the BLE technology.

FIG. 6 shows an example of a method for transmitting data changed indication information in the BLE technology proposed in this specification.

FIG. 7 shows another example of a method for transmitting data changed indication information in the BLE technology proposed in this specification.

FIG. 8 shows yet another example of a method for transmitting data changed indication information in the BLE technology proposed in this specification.

FIG. 9 shows an example of a method for transmitting data changed indication information when a new firmware image is created in the BLE technology proposed in this specification.

FIG. 10 shows another example of a method for transmitting data changed indication information when a new firmware image is created in the BLE technology proposed in this specification.

FIG. 11 shows an example of a method for transmitting data changed indication information using information about an event creation time when a new firmware image is created in the BLE technology proposed in this specification.

FIG. 12 is a diagram showing an example of a method for changing an object and searching for a changed object using an object list control point (OLCP) in the BLE technology proposed in this specification.

FIG. 13 is a diagram showing another example of a method for changing an object and searching for a changed object using an action control point (OACP) in the BLE technology proposed in this specification.

MODE FOR INVENTION

In what follows, the present invention will be described in more detail with reference to appended drawings.

A suffix such as "module" and "unit" introduced in the description below is assigned merely to facilitate description of this document, and the "module" and "unit" can be used interchangeably.

Meanwhile, a device according to this document refers to a device capable of wireless communication, including a mobile phone including a smartphone, tablet PC, desktop computer, notebook, and television including a smart TV and IPTV.

In what follows, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms can be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 is a schematic diagram showing an example of a wireless communication system using a BLE technology proposed in this specification.

The wireless communication system 100 includes at least one server device 110 and at least one client device 120.

The server device and the client device perform Bluetooth communication using a Bluetooth low energy (hereinafter referred to as "BLE") technology.

Compared to the Bluetooth basic rate/enhanced data rate (BR/EDR) technology, the BLE technology has a relatively small duty cycle and enables low price production, and may operate for one year or more if a coin cell battery is used because power consumption can be significantly reduced through a low-speed data transfer rate.

Furthermore, in the BLE technology, a connection procedure between devices has been simplified, and a packet size has been designed to be smaller than that in the Bluetooth BR/EDR technology.

In the BLE technology, (1) the number of RF channels is 40, (2) a data transfer rate is 1 Mbps, (3) a topology is a start structure, (4) latency is 3 ms, (5) a maximum current is 15 mA or less, (6) output power is 10 mW (10 dBm) or less, and (7) the BLE technology is chiefly used in applications, such as mobile phones, watches, sports, health-care, sensors, and device control.

The server device 110 may operate as a client device in the relationship with other devices. The client device may operate as a server device in the relationship with other devices. That is, in the BLE communication system, any one device may operate as a server device or a client device and may also operate as both a server device and a client device, if necessary.

The server device 110 may be represented as a data server device, a master device, or a server, and the client device may be represented as a slave device or a client.

The server device and the client device correspond to major elements of the wireless communication system. The wireless communication system may include other elements in addition to the server device and the client device.

The server device refers to a device which receives data from the client device, directly performs communication with the client device, and provides data to the client device through a response when it receives a data request from the client device.

Furthermore, the server device sends a notification message or an indication message to the client device in order to provide data (or information) to the client device. Furthermore, when the server device sends an indication message to the client device, it receives a confirm message, corresponding to the indication message, from the client device.

Furthermore, the server device may provide data (or information) to a user through a display unit or receive a request from a user through a user input interface in the process for transmitting and receiving the notification, indication, and confirm messages to and from the client device.

Furthermore, the server device may read data from a memory unit and write new data into a corresponding memory unit in the process for transmitting (or sending) and receiving message to and from the client device.

Furthermore, one server device may be connected to a plurality of client devices and may be connected (or coupled) to the client devices again using bonding information.

The client device 120 refers to a device which requests data (or information) and data transmission from the server device.

The client device receives data from the server device through a notification message or an indication message and sends a confirm message as a response to an indication message when it receives the indication message from the server device.

Likewise, the client device may provide information to a user through a display unit or receive an input from a user through a user input interface in the process for transmitting and receiving messages to and from the server device.

Furthermore, the client device may read data from a memory unit or write new data into a corresponding memory unit in the process for transmitting and receiving messages to and from the server device.

Hardware elements, such as the display units, user input interfaces, and memory units of the server device and the client device, are described in more detail with reference to FIG. 2.

Furthermore, the wireless communication system may configure personal area networking (PAN) through a Bluetooth technology. For example, in the wireless communication system, files, documents, etc. can be exchanged rapidly and safely because a private piconet is established between devices.

A BLE device may operate to support various Bluetooth-related protocol, profiles, processing, etc.

FIG. 2 shows an example of the internal configurations of the server device and the client device, which is proposed in this specification.

As shown in FIG. 2, the server device includes a display unit 111, a user input interface 112, a power supply unit 113, a processor 114, a memory unit 115, a Bluetooth interface 116, another interface 117, and a communication unit 118 (or a transmission/reception unit).

The display unit 111, the user input interface 112, the power supply unit 113, the processor 114, the memory unit 115, the Bluetooth interface 116, another interface 117, and the communication unit 118 are operatively connected in order to perform a method proposed in this specification.

Furthermore, the client device includes a display unit 121, a user input interface 122, a power supply unit 123, a processor 124, a memory unit 125, a Bluetooth interface 126, and a communication unit 127 (or a transmission/reception unit).

The display unit 121, the user input interface 122, the power supply unit 123, the processor 124, the memory unit 125, the Bluetooth interface 126, and the communication unit 127 are operatively connected in order to perform a method proposed in this specification.

The Bluetooth interface 116, 126 refers to a unit (or a module) capable of the transmission of request/response, command, notification, and indication/confirm messages or data between devices using a Bluetooth technology.

The memory unit 115, 125 refers to a unit which is implemented in various types of devices and in which various types of data are stored.

The processor 114 or 124 refers to a module for controlling an overall operation of the server device or the client device, and performs control so that messages whose transmission has been requested or which have been received are processed through the Bluetooth interface and another interface.

The processor 114, 124 may be represented as a control part, a control unit, or a controller.

The processor 114, 124 may include application-specific integrated circuits (ASICs), other chipsets, logic circuits and/or data processing units.

The processor 114, 124 controls the communication unit so that it receives an advertising message, including information related to an object transfer service, from the server device, sends a scan request message to the server device, controls the communication unit so that it receives a scan response message from the server device as a response to the scan request, controls the communication unit so that it sends a connect request message to the server device in order to establish a Bluetooth communication connection with the server device, and controls the communication unit so that it receives object identification indication information, including object identification information indicative of a changed object, from the server device.

Furthermore, the processor 114, 124 controls the communication unit so that it receives object filter information, including an object list of only objects marked by a marking type indicative of object characteristics, from the server device.

Furthermore, the processor 114, 124 controls the communication unit so that it sends operation code (Op code) information indicative of a change of a marked object value of an object list to the server device.

Furthermore, the processor 114, 124 controls the communication unit so that it sends object list control point (OLCP) information, including Op code information indicative of a movement to an object having a specific object ID of the object list, to the server device.

The memory unit 115, 125 may include read-only memory (ROM), random access memory (RAM), a flash memory unit, a memory unit card, a storage medium and/or other storage devices.

The communication unit 118, 127 may include a baseband circuit for processing radio signals. When an embodiment is implemented in software, the aforementioned scheme may be implemented into a module (or a process or function) for performing the aforementioned function. The module may be stored in the memory unit and executed by the processor.

The memory unit 115, 125 may be placed inside or outside the processor 114, 124 and may be connected to the processor 114, 124 by various well-known means.

The display unit 111, 121 refers to a module for providing state information about a device and message exchange information to a user through a screen.

The power supply unit 113, 123 refers to a module for being supplied with external power and internal power and for supplying power for the operations of each element under the control of the processor.

As described above, the BLE technology has a small duty cycle and can significantly reduce power consumption through a low-speed data transfer rate. Accordingly, the power supply unit can supply power for the operation of each element with low output power (e.g., 10 mW (10 dBm) or lower).

The user input interface 112, 122 refers to a module for enabling a user to control the operation of the device by providing the processor with a user input, such as a screen button.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which can be connected on an advertising physical channel, and the device A is an initiator. The device A can establish a connection to the device D and add a device to the piconet A.

In group C, the device C advertises on an advertising physical channel by using a certain type of an advertisement event captured by the scanner device E.

The group D and the group C can utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which can be connected to an advertising physical channel, and the device N is an initiator. The device N can establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which can be connected to an advertising physical channel, and the device O is an initiator. The device O can establish a connection with the device R. At this time, the device O acts as a slave of two devices, and at the same time, a master of one device.

FIG. 4 is a view illustrating an example of a Bluetooth low power energy architecture, to which methods proposed in this disclosure is applicable.

As shown in FIG. 4, the BLE structure includes a controller stack that may operate to process a wireless device interface in which timing is important and a host stack that may operate to process high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 410, GATT based Profiles 420, Generic Attribute Profile (GATT) 430, Attribute Protocol (ATT) 440, Security Manager (SM) 450, and Logical Link Control and Adaptation Protocol (L2CAP) 460. The host stack is not limited to the aforementioned composition, but can include various protocols and profiles.

By using the L2CAP, the host stack multiplexes various protocols and profiles that Bluetooth specification provides.

First, the L2CAP 460 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 450 authenticates a device, which is a protocol for providing key distribution.

The Attribute Protocol (ATT) 440 relies on a server-client structure, which defines rules for the corresponding device to access data. Six message types are defined: Request, Response, Command, Notification, Indication, and Confirmation.

Request and Response message: Request message is used when a client device requests specific information from a server device, and Response message is used in response to the Request message, which is transmitted from the server device to the client device.

Command message: It is transmitted from the client device to the server device to indicate a command for specific operation, but the server device does not transmit a response to the Command message to the client device.

Notification message: The server device transmits this message to the client device to notify of an event, but the client device does not transmit a confirmation message with respect to the Notification message to the server.

Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

Service: a combination of behaviors related to data. Defines basic operation of a device.
Include: defines a relationship between services.
Characteristics: a data value used by a service
Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.
Time: method for exchanging time information.
FindMe: provides an alarm service according to a distance.
Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 490, link layer 480, and host controller interface 470.

The physical layer (wireless transmission and reception module 490) transmits and receives a radio signal of 2.4 GHz; and uses Gaussian Frequency Shift Keying (GFSK) modulation and frequency hopping utilizing 40 RF channels.

The link layer 480 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening deives).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by transmitting a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by transmitting a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

FIG. 5 is a diagram showing an example of a method for providing an object transfer service in the BLE technology.

The object delivery service (or object transfer service) refers to a service which is supported in the BLE technology in order to send or receive an object or data, such as bulk data, in Bluetooth communication.

In order to establish a Bluetooth communication connection between the server device 110 and the client device 120, an advertising process and a scanning process corresponding to steps S510~S530 are performed.

First, the server device sends an advertising message to the client device in order to provide notification of server device-related information including an object transfer service (S510). The advertising message may be represented as an advertising packet data unit (PDU), an advertising packet, an advertisement, an advertising frame, or an advertising physical channel PDU.

The advertising message may include service information (including a service name), the name of a server device, and manufacturer data provided by the server device.

Furthermore, the advertising message may be transmitted to the client device in a broadcasting manner or a unicast manner.

Thereafter, the client device sends a scan request message to the server device in order to provide notification of more detailed information related to the server device (S520).

The scan request message may be represented as a scanning PDU, a scan request PDU, a scan request, a scan request frame, or a scan request packet.

Thereafter, the server device sends a scan response message to the client device as a response to the scan request message received from the client device (S530).

The scan response message includes the server device-related information requested by the client device. In this case, the server device-related information may be an object or data which may be transmitted by the server device in relation to the provision of an object transfer service.

When the advertising process and the scanning process are terminated, the server device and the client device performs an initiating connection process and a data exchange process corresponding to steps S540~S570.

More specifically, the client device sends a connect request message to the server device in order to establish a Bluetooth communication connection with the server device (S540).

The connect request message may be represented as a connection request PDU, an initiation PDU, a connection request frame, or a connection request.

The Bluetooth communication connection is established between the server device and the client device through step S540. Thereafter, the server device and the client device exchange data. In the data exchange process, the data may be transmitted and received through a data channel PDU.

The client device sends an object data request to the server device through a data channel PDU (S550). The data channel PDU may be represented as a data request message or a data request frame.

Thereafter, the server device sends the object or data, requested by the client device, to the client device through a data channel PDU (S560).

In this case, the data channel PDU is used to provide data to a counterpart device or to request data (or information) from the counterpart device using a method defined in the Attribute protocol.

Thereafter, when a change of data or an object is generated in the server device, the server device sends data changed indication information to the client device through a data channel PDU in order to provide notification of a change of the data or object (S570).

The client device requests changed object information from the server device in order to search for the changed data or object (S580).

The server device sends the changed object information to the client device in response to the request for the changed object information (S590).

Thereafter, the client device searches for the changed object or data through a comparison and analysis between the received changed object information and the current object information of the client device.

In this case, the client device repeatedly performs steps S580 to S590 until it searches for the changed object or data.

As described above, a detailed method of directly notifying, by the server device, the client device that which data has been changed and a detailed method of directly notifying, by the server device, the client device whether new data has been created or not is not present.

Furthermore, a lot of time and power are wasted because the server device and the client device repeatedly perform steps S580 to S590 until the changed object or data is searched for.

In FIG. 5, an example in which (1) the server device provides notification that an object transfer service is provided and (2) an object or data is changed has been illustrated, but this specification is not limited thereto. This specification may also be likewise applied to an example in which the client device provides notification that an object transfer service is provided and an object or data is changed in the client device.

FIG. 6 shows an example of a method for transmitting data changed indication information in the BLE technology proposed in this specification.

Steps S610 to S660 of FIG. 6 are the same as steps S510 to S560 of FIG. 5, and thus a detailed description thereof is omitted below.

When a new object or data is created in the server device, the server device sends data changed indication information, including (creation) flag information indicating whether an object or data has been created or not, to the client device through a data channel PDU (S670).

Table 2 shows an example of the format of the data changed indication information.

TABLE 2

| | FLAGS |
|---|---|
| Octet Order | N/A |
| Format type | 8 bits |
| Size | 1 octet |
| Units | Unitless |

Referring to Table 2, the data changed indication information includes a flag field (or information). The flag field has a format type of 8 bits and has a size of 1 octet (or byte).

Table 3 shows an example of the format of the flag field within the data changed indication information.

TABLE 3

| BIT | DEFINITION |
|---|---|
| 0 | Who request Change<br>0: Server<br>1: Other Client |
| 1 | Object Changed<br>0: False<br>1: True |
| 2 | Metadata Changed<br>0: False<br>1: True |
| 3 | Deletion<br>0: False<br>1: True |
| 4 | Creation<br>0: False<br>1: True |
| 5-7 | Reserved for Future Use |

Referring to Table 3, the flag field indicates data changed information.

The 0-th bit value of the flag field is a value indicating that a change of an object has occurred in which device. For example, if the 0-th bit value is "0", it indicates that a change of an object has occurred in the server device. If the 0-th bit value is "1", it indicates that a change of an object has occurred in another client device.

The first bit value of the flag field is a value indicating whether an object itself has been changed. For example, if the first bit value is "0", it indicates that there is no change in an object. If the first bit value is "1", it indicates that an object has been changed.

The second bit value of the flag field is a value indicating whether the metadata of an object has been changed. For example, if the second bit value of the flag field is "0", it indicates that there is no change in the metadata of an object. If the second bit value of the flag field is "1", it indicates that the metadata of an object has been changed.

The third bit value of the flag field is a value indicating whether an object has been deleted. For example, if the third bit value of the flag field is "0", it indicates that an object has not been deleted. If the third bit value of the flag field is "1", it indicates that an object has been deleted.

The fourth bit value of the flag field is a value indicating whether an object has been created or not. For example, if the fourth bit value of the flag field is "0", it indicates that an object has not been created. If the fourth bit value of the flag field is "1", it indicates that an object has been created.

FIG. 7 shows another example of a method for transmitting data changed indication information in the BLE technology proposed in this specification.

Steps S710~S760 of FIG. 7 are the same as steps S510~S560 of FIG. 5, and thus a detailed description thereof is omitted below.

When a change of an object is generated in the server device, the server device sends data changed indication (or object changed indication) information, including object identification information indicative of (or indicating) a changed object, to the client device through a data channel PDU (S770).

In this case, the object identification information may include all means capable of identifying the changed object. The object identification information may be the name of the changed object or the identifier (ID) of the changed object. In this case, the object identification information may include both the name of the changed object and the ID of the changed object.

Table 4 is a format showing an example of the object identification information.

TABLE 4

| | CHANGE-ABLE | READ-ABILITY | WHO ASSIGNS VALUES? | SUPPORT PROPERTIES |
|---|---|---|---|---|
| Object Name | Yes | Good | System or User | Read, Write |
| Object ID | No | Bad | System | Read |

Referring to Table 4, the object name is changeable, has good readability, has a value allocated by a system or user, and supports both read and write.

In contrast, the object ID is unchangeable, has poor readability, has a value allocated by a system, and supports only read. Furthermore, the object ID is not changed by a person and maintains the same value until it is deleted when a value is allocated by a system (or a server).

The object ID refers to an identifier which is used to identify a specific object, such as an object name. If the object ID is used, a change of an object may be tracked although the object is changed.

Furthermore, the object ID may use a value based on a number or string. For example, a text string of an 8-bit, 16-bit or 32-bit number value or a specific length or more may be used as the object ID.

In general, a number value is used as the object ID. The length of the object ID may be changed depending on system specifications.

Furthermore, the object ID may be used as the auxiliary means of an object name.

Table 5 shows characteristics related to the object identification information.

TABLE 5

| CHARAC-TERISTICS | OBJECT ACTION CONTROL POINT | OBJECT LIST CONTROL POINT | OBJECT FILTER |
|---|---|---|---|
| Object Name | Read, Write, Append | Order the list by Object Name (ascending or descending) MoveTo Object Name | Name Starts With Name Ends With Name Contains |
| Object ID | Read | Order the list by Object ID (ascending or descending) MoveTo Object ID | Object ID |

Referring to Table 5, the object ID characteristic may be red using the read function of an object action control point (OACP) and may be arranged based on an object ID using an object list control point (OLCP) function.

Furthermore, the object ID characteristic selects an object having a specific object ID as the current object through a MoveTo Object ID function (if the object ID is unique).

In this case, the MoveTo Object ID function may be identically provided as an Object Name.

Furthermore, the object ID characteristic enables only a corresponding object ID to be seen using an object filter function.

Table 6 shows an example of the format of the object ID included in the data changed indication information.

TABLE 6

|  | Flags | Changed Object ID |
|---|---|---|
| Octet Order | N/A | N/A |
| Format type | 8 bits | String or Integer |
| Size | 1 octet | Variable or Fixed possible |

Referring to Table 6, the changed object ID may not use a string, but may use another format (e.g., an integer), and the size of the changed object ID may be variable or fixed.

Table 7 shows an example of the format of the object name included in the data changed indication information.

TABLE 7

|  | Flags | Changed Object Name |
|---|---|---|
| Octet Order | N/A | N/A |
| Format type | 8 bits | String |
| Size | 1 octet | Variable or Fixed possible |

Thereafter, the client device sends an object request message to the server device in order to request an object (i.e., a changed object) corresponding to the object identification information (S780).

In this case, the object request message may be represented as an object request or an object request PDU.

Thereafter, the server device sends the data of the changed object or object to the client device (S790).

As described above, FIG. 7 shows an example in which the server device provides notification that an object transfer service is provided and an object is changed. This specification is likewise applied to an example in which the client device provides notification that an object transfer service is provided and an object is changed as in the process of FIG. 7.

That is, the client device performs advertising, sends object identification information indicative of a changed object or data to the server device when the object or data is changed in the client device, and sends the changed object to the server device when the server device requests the changed object corresponding to the object identification information.

FIG. 8 shows yet another example of a method for transmitting data changed indication information in the BLE technology proposed in this specification.

Steps S810~S860 of FIG. 8 are the same as steps S510~S560 of FIG. 5, and thus a detailed description thereof is omitted below.

When a change of an object or data is generated in the server device, the server device sends data changed indication information, including event generation time information indicative of the time when a change of the object or data is generated, to the client device through a data channel PDU (S870).

The event generation time information may include all of means which may be represented, such as a date (year, month, day), time (hour, minute, second), and may have a variable size depending on means.

Thereafter, the client device searches for the changed object or data based on the received event generation time information (or using the received event generation time information) (S880).

In this case, the client device may search the server device for the changed object or data using various types of time information, such as the last-modified time, a generation time, and the last-access time.

Table 8 shows an example of the data changed indication information format including the event generation time information.

TABLE 8

|  | Flags | Event Time |
|---|---|---|
| Octet Order | N/A | N/A |
| Format type | 8 bits | Time |
| Size | 1 octet |  |

FIG. 9 shows an example of a method for transmitting data changed indication information when a new firmware image is created in the BLE technology proposed in this specification.

In this case, the server device may be a gateway (G/W, the client device may be a sensor, and an object or data provided by an object transfer service may be a firmware image.

FIG. 9 corresponds to the case where a new firmware image is created after a Bluetooth communication connection between the server device and the client device is established.

As shown in FIG. 9, the server device sends an advertising message to the client device in order to notify the client device of the provision of an object transfer service (S910).

Thereafter, the client device sends a connect request message to the server device in order to establish a Bluetooth communication connection (S920).

The Bluetooth communication connection is established between the server device and the client device through step S920.

Thereafter, when a new firmware image (F/W) ("firmware 1.1") is created in the server device (S930), the server device sends data changed indication information, including the created firmware image name ("firmware 1.1"), to the client device (S940).

In this case, the created new firmware image may be downloaded from the Internet or may be stored by a user.

In this case, the server device may send the data changed indication information to all of client devices connected thereto.

In this case, if the created firmware image name is not transmitted, the client device needs to perform a search task for accessing the server device in order to search for a corresponding file and for checking whether a newly created or changed file is present or not. In this case, a lot of time and power are wasted through the search task.

Furthermore, if an existing firmware image is present and a newly created firmware image corresponds to a higher version of the existing firmware image, the server device may send a changed object or data, including a data change field included in data changed indication information.

Thereafter, the client device checks whether the created firmware image corresponds to its own new firmware image based on the received firmware image name (S950).

If, as a result of the check, it is found that the created firmware image is a new firmware image corresponding to the client device, the client device sends a request for the new firmware image, that is, a newly created object, to the server device (S960).

If, as a result of the check, it is found that the created firmware image is not a firmware image corresponding to the client device or not a new firmware image, the client device does not send a request for the new firmware image to the server device.

Thereafter, the server device sends the newly created firmware image to the client device (S970).

Thereafter, the client device updates an existing firmware image with the new firmware image received from the server device (S970).

FIG. 10 shows another example of a method for transmitting data changed indication information when a new firmware image is created in the BLE technology proposed in this specification.

In this case, the server device may be a gateway (G/W), the client device may be a sensor, and an object or data provided by an object transfer service may be a firmware image.

FIG. 10 corresponds to the case where a new firmware image has been created before a Bluetooth communication connection between the server device and the client device is established.

As shown in FIG. 10, a new firmware image (F/W) ("firmware 1.1") is created in the server device (S1010).

In this case, the new firmware image may be downloaded from the Internet or may be stored by a user.

Thereafter, the server device sends an advertising message to the client device in order to notify the client device of the provision of an object transfer service (S1020). As described above, the advertising message may be represented as an advertising PDU, an advertising channel PDU, an advertisement, or an advertising frame.

Thereafter, the client device sends a connect request message to the server device in order to establish a Bluetooth communication connection (S1030).

The Bluetooth communication connection is established between the server device and the client device through step S1030.

Thereafter, the server device sends data changed indication information, including the created firmware image name ("firmware 1.1"), to the client device (S1040).

In this case, the server device may send the data changed indication information to all of client devices connected thereto.

In this case, if the created firmware image name is not transmitted, the client device needs to perform a search task for accessing the server device in order to search for a corresponding file and for checking whether a newly created or changed file is present or not. In this case, a lot of time and power are wasted through the search task.

Furthermore, if an existing firmware image is present, the server device may send only a changed object or data, including a data change field included in data changed indication information.

Thereafter, the client device checks whether the created firmware image corresponds to its own new firmware image based on the received new firmware image name (S1050).

If, as a result of the check, it is found that the created firmware image is a new firmware image corresponding to the client device, the client device sends a request for the new firmware image to the server device (S1060).

If, as a result of the check, it is found that the created firmware image is not a firmware image corresponding to the client device or not a new firmware image, the client device does not sends a request for the new firmware image to the server device.

Thereafter, the server device sends the new firmware image, requested by the client device, to the client device (S1070).

Thereafter, the client device updates an existing firmware image with the new firmware image received from the server device (S1080).

For another example, a new firmware image may be created in the client device, and the client device may send the new firmware image to the server device. In this case, transmission and reception operations opposite the transmission and reception operations between the server device and the client device described with reference to FIG. 10 are performed.

FIG. 11 shows an example of a method for transmitting data changed indication information using information about an event creation time when a new firmware image is created in the BLE technology proposed in this specification.

A new firmware image (a firmware image name "firmware 1.1") is generated in the server device (S1110). The time when the firmware image is created is called event generation time information.

In this case, the event generation time information may be all of means which may be represented, such as a date (year, month, day) or time (hour, minute, second), and may have a variable size depending on means.

Thereafter, the server device sends an advertising message to the client device in order to notify the client device of the provision of an object transfer service (S1120). The advertising message may be represented as an advertising PDU, an advertising channel PDU, or an advertisement.

Thereafter, the client device sends a connect request message to the server device in order to establish a Bluetooth communication connection (S1130).

The Bluetooth communication connection is established between the server device and the client device through step S1130.

Thereafter, the server device sends data changed indication information, including the time when a new firmware image is created, that is, event generation time information, to the client device (S1140).

In this case, the server device may send the data changed indication information to all of client devices connected thereto.

In this case, if the event generation time information is not transmitted, the client device needs to perform a search task for accessing the server device in order to search for a corresponding file and for checking whether a newly created or changed file is present or not. In this case, a lot of time and power are wasted through the search task.

Thereafter, the client device searches for a newly created firmware image using the received event generation time information (S1150).

The client device may search for the firmware image, created in the server device, using various types of time information, such as the last modified time, a creation time, and the last-access time.

Thereafter, the client device checks whether the retrieved new firmware image corresponds to its own new firmware image (S1160).

If, as a result of the check, the retrieved new firmware image corresponds to a new firmware image corresponding to the client device, the client device sends a request for the new firmware image to the server device (S1170).

If, as a result of the check, it is found that the retrieved firmware image is not a new firmware image corresponding to the client device or not a new firmware image, the client device does not send a request for the new firmware image to the server device.

Thereafter, the server device sends the new firmware image, requested by the client device, to the client device (S1180).

Thereafter, the client device updates an existing firmware image with the new firmware image received from the server device (S1190).

A method for transmitting an object list, an object list control point (OLCP) for designating a current object, and an object action control point (OACP), which are proposed in this specification, are described in more detail below.

First, a method for transmitting an object using an object filter, which is proposed in this specification, is described below.

The server device selects a list of specific objects of objects (which perform support, management or services) using object filter information, and shows the selected object list to the client device.

For example, if a filter value of 0x09 has been set in the object filter information, only objects selected based on a marking type are showed in a list form. For detailed contents of the marking type, reference is made to Table 10.

For another example, if a filter value of 0x0A (may be changed to a specific value) has been set in the object filter information, only objects having an object ID value included in the object filter information are showed in a list form.

Table 9 shows an example of the format of the object filter information.

TABLE 9

| FILTER VALUE | FILTER DESCRIPTION | PARAMETER DESCRIPTION | |
|---|---|---|---|
| 0x00 | No Filter (everything passes) | N/A | |
| 0x01 | Name Starts With | String (UTF-8) | |
| 0x02 | Name Ends With | String (UTF-8) | |
| 0x03 | Name Contains | String (UTF-8) | |
| 0x04 | Object Type (UUID) | UUID (gatt_uuid) | |
| 0x05 | Created between (inclusive):timestamp1<=t<=timestamp2 | LSO timestamp1 | MSO Timestamp2 |
| 0x06 | Modified between (inclusive):timestamp1<=t<=timestamp2 | LSO timestamp1 | MSO Timestamp2 |
| 0x07 | Accessed between (inclusive):timestamp1<=t<=timestamp2 | LSO timestamp1 | MSO Timestamp2 |
| 0x08 | Allocated Size between (inclusive):Size1<=s<=size2 | LSO size1 (UINT32) | MSO size2 (UINT32) |
| 0x09 | Marked Objects | Marking Type (UINT 8) | |
| 0x0A | Object ID | ID Value | |
| 0x0A-0xFF | Reserved for future use | N/A | |

The object filter selects a list of objects to be showed to the client device. Referring to Table 9, "No Filter" shows all objects in a list form without a limit. "Name Starts With" shows only objects, each having an object name that starts from a specific passage, in a list form.

"Name Ends With" shows only objects, each having an object name that ends with a specific passage, in a list form. "Name Contains With" shows only objects, each having a specific passage as an object name, in a list form.

"Object Type (UUID)" shows only objects, each having an object type of a specific UUID, in a list form.

"Created between (inclusive): timestamp1<=t<=timestamp2" shows only objects, each having a First-Created time between timestamp1 and timestamp2, in a list form.

"Modified between (inclusive): timestamp1<=t<=timestamp2" shows only objects, each having a Last-Modified time between timestamp1 and timestamp2, in a list form.

"Accessed between (inclusive): timestamp1<=t<=timestamp2" shows only objects, each having a Last-Accessed time between timestamp1 and timestamp2, in a list form.

"Allocated Size between (inclusive): size1<=t<size2" shows only objects, each having a size allocated thereto between size1 and size2, in a list form.

"Marked Objects" shows only objects selected based on a marking type, in a list form.

If an object filter value is indicative of Marked Objects, it shows all marked objects when nothing is selected.

Table 10 shows an example of the format of the marking type. AND or OR operation of a condition is possible through bit operation. If the last bit is "1", the marking type may be AND operation. If the last bit is "0", the marking type may be OR operation.

TABLE 10

| $1^{st}$ bit | $2^{nd}$ bit | $3^{rd}$ bit | $4^{th}$ bit | $5^{th}$ bit | $6^{th}$ bit | $7^{th}$ bit | $8^{th}$ bit |
|---|---|---|---|---|---|---|---|
| Object Created | Object Metadata Created | Object Contents Changed | Object Written | Object Appended | Reserved for Future Use | | AND/OR Operation |

An object list control point (OLCP) for controlling an object list, which is proposed in this specification, is described in more detail below.

The OLCP provides a mechanism by which the client device searches for a preferred object and designates a corresponding object as the current object. Furthermore, the OLCP is used by the client device in order to control a specific action of the server device.

In order to designate the current object, the client device sends OLCP information, including information indicating that a specific object of an object list should be designated as the current object, to the server device.

For example, if a "MoveTo (or GoTo)" field value has been set in OLCP information, it means a movement to an object having a specific object name or specific object ID included in the OLCP information of an object list.

Table 11 shows an example of the format of the OLCP information.

TABLE 11

| OP CODE VALUE | PROCEDURE | REQUIREMENT | PARAMETER | APPLICABLE RESPONSE VALUE | RESPONSE PARAMETER |
|---|---|---|---|---|---|
| 0x00 | | | | Reserved for Future Use | |
| 0x01 | First | M | None | Success, Operation Failed, Too Many Objects, No Object | None |
| 0x02 | Last | M | None | Success, Operation Failed, Too Many Objects, No Object | None |
| 0x03 | Previous | M | None | Success, At First, Operation Failed, Too Many Objects, No Object | None |
| 0x04 | Next | M | None | Success, At Last, Operation Failed, Too Many Objects, No Object | None |
| 0x05 | Skip By | O | Skip Number (SINT48) | Success, Invalid Parameter, At First, At Last, Op Code Not Supported, Operation Failed, Too Many Objects, No Object | None |
| 0x06 | Order | O | List Sort Order (UINT8) | Success, Invalid Parameter, Op Code Not Supported, Operation Failed, Too Many Objects, No Object | None |
| 0x07 | Request Number of Objects | O | None | Success, Op Code Not Supported, Operation Failed, Too Many Objects, No Object | Total Number of Objects (UINT32) |
| 0x08 | MoveTo (GoTo) | | Object Name or Object ID | Success, Op Code Not Supported, Operation Failed, No Object | |
| 0x08-0x6F | | | | Reserved for Future Use | |
| 0x70 | Response Code | M | OLCP Response value | | N/A |

Referring to Table 11, if the Op Code Value field is 0x01, it is the "First" procedure indicating a movement to the foremost of an object list. If the Op Code Value field is 0x02, it is the "Last" procedure indicating a movement to the very last of an object list. If the Op Code Value field is 0x03, it is the "Previous" procedure indicating a movement ahead by one in an object list. If the Op Code Value field is 0x04, it is the "Next" operation indicating a movement to the back by one in an object list. If the Op Code Value field is 0x05, it is the "Skip By" operation indicating a movement ahead (in the case of a negative number) or to the back (in the case of a positive number) by a designated number in an object list. If the Op Code Value field is 0x06, it is the "Order" operation indicating a change of the sequence of an object list to a designated value. If the Op Code Value field is 0x07, it is the "Request Number of Objects" operation indicating the number of objects provided in an object list.

If the Op Code Value field is 0x08, it is the "MoveTo" operation indicating a movement to an object that belongs to an object list and has a specific object name or object ID.

For another example, a "SetMark (or ClearMark)" field value may be included in the OLCP information. The "SetMark (or ClearMark)" field value changes (or deletes) the marked value of an object. For example, if the "SetMark" field value is "True", an object is marked. If the "SetMark" field value is "False", an object is unmarked.

Furthermore, if a "ClearMark" Op Code value is written in the OLCP, Marking Clearing is supported. The server device updates (unmarked) object marking so that all of the objects of an object list are not displayed on the client device that has sent ClearMark Op Code.

In this case, the "SetMark (or ClearMark)" field value may be included in an object operation control point (OACP) and transmitted to the server device.

An OACP for controlling an object operation, which is proposed in this specification, is described in more detail below.

The OACP is used by the client device in order to control a specific operation of the server device.

An OACP process affects only the current object other than a creation process of generating a new object.

The client device sends OACP information, including information indicative of control of the operation of an object, to the server device.

For example, if the "SetMark (or ClearMark)" field value has been set in the OACP information, the marked value of an object is changed. For example, if the "SetMark" field value is "True", an object is marked. If the "SetMark" field value is "False", an object is unmarked.

For example, if the "ClearMark" Op Code value is written in the OLCP, Marking Clearing is supported. The server device updates (unmarked) object marking so that all of the objects of an object list are not displayed on the client device that has sent ClearMark Op Code.

In this case, the "SetMark (or ClearMark)" field value may be included in the OLCP and transmitted to the server device.

Table 12 shows an example of the format of the OACP information.

TABLE 12

| OP CODE VALUE | PROCEDURE | REQUIREMENT | PARAMETER | APPLICABLE RESPONSE VALUE | RESPONSE PARAMETER |
|---|---|---|---|---|---|
| 0x00 | | | Reserved for Future Use | | |
| 0x01 | Create | O | Type (gatt uuid), Size (UINT32) | Op Code Not Supported, Invalid Parameter, Insufficient Resources, Unsupported Type, Operation Failed, Success | None |
| 0x02 | Delete | O | No Parameter | Op Code Not Supported, Operation Failed, Success | None |
| 0x03 | Calculate Checksum | O | Length (UINT32) | Op Code Not Supported, Invalid Parameter, Invalid Object, Operation Failed, Success | None |
| 0x04 | Execute | O | Parameter may be defined by a higher level spec-none otherwise | Op Code Not Supported, Invalid Parameter, Invalid Object, Operation Failed, Success | None |
| 0x05 | Read | O | Length (UINT32) | Op Code Not Supported, Invalid Parameter, Insufficient Resources, Invalid Object, Channel Unavailable, Operation Failed, Success | None |
| 0x06 | Write | O | Length (UINT32) | Op Code Not Supported, Invalid Parameter, Insufficient Resources, Invalid Object, Channel Unavailable, Operation Failed, Success | None |
| 0x07 | Append | O | Length (UINT32) | Op Code Not Supported, Invalid Parameter, Insufficient Resources, Invalid Object, Channel Unavailable, Operation Failed, Success | Total Number of Objects (UINT32) |
| 0x08 | Seek End | O | No Parameter | Op Code Not Supported, Operation Failed, Invalid Object, Success | |
| 0x09 | SetMark- (ClearMark) | O | Boolean | Op Code Not Supported, Operation Failed, Invalid Object, Success | N/A |

Referring to Table 12, if the Op Code Value field is 0x01, it is the "Create" operation indicative of the creation of an object. If the Op Code Value field is 0x02, it is the "Delete" operation indicative of the deletion of an object. If the Op Code Value field is 0x03, it is the "Calculate Checksum" operation indicative of checksum calculation. If the Op Code Value field is 0x04, it is the "Execute" operation indicative of the execution of an object. If the Op Code Value field is 0x05, it is the "Read" operation indicative of object data read. If the Op Code Value field is 0x06, it is the "Write" operation indicative of object data write. If the Op Code Value field is 0x07, it is the "Append operation indicative of object data addition write. If the Op Code Value field is 0x08, it is the "SeekEnd" operation indicating that an object matter (e.g., write or read) is executed to the end of an offset. If the Op Code Value field is 0x09, it is the "SetMarking (or ClearMarking)" operation indicative of a change in the marked value of an object.

In this case, a Boolean value is used as the parameter "SetMarking". For example, if the Boolean value is "True", an object is marked. If the Boolean value is "False", an object is unmarked.

When the SetMarking operation is used, a marked object may be set in the client device.

If a changed object is a marked object, the client device unmarks the marked object when checking the corresponding object.

A method for changing an object and a method for searching for a changed object in the BLE technology proposed in this specification are described in more detail below.

FIG. 12 is a diagram showing an example of a method for changing an object and searching for a changed object using an object list control point (OLCP) in the BLE technology proposed in this specification.

The server device 110 sends an advertising message to the client device 120 in order to notify the client device of the provision of an object transfer service (OTS) (S1210). As described above, the advertising message may include service information (including a service name) provided by the server device, the name of the server device, and manufacturer data.

Thereafter, the client device sends a connect request message to the server device in order to establish a Bluetooth communication connection (S1220).

The Bluetooth communication connection is established between the server device and the client device through step S1220.

Thereafter, the server device changes an object or data in response to a server-itself action or a request from the client device (S1230).

Thereafter, the server device sends data changed indication information, including object identification information capable of identifying the changed object or data, to the client device (S1240).

The object identification information may be the name of the changed object or the ID of the changed object.

In this case, the object identification information is assumed to be "Object Name=1."

The client device may easily search the server device for the changed object using the received data changed indication information in the future.

Thereafter, the client device uses the MoveTo command of an OLCP in order to search for an object indicated by the data changed indication information (or in order to designate an object as the current object). That is, the client device sends OLCP information, including an Op Code Value field indicative of a movement to an object that belongs to an object list and that has "Object Name=1", to the server device so that an object having the "Object Name=1" value is designated as the current object and that the server device designates the current object as an object having the "Object Name=1" value (S1250). For the OLCP information, reference is made to Table 11.

Thereafter, the server device designates the current object as an object having "Object Name=1" based on the received OLCP information (S1260).

In FIG. 12, an example in which the server device performs advertising and an object name is changed has been illustrated. However, the contents described with reference to FIG. 12 may be identically applied to an example in which the client device performs advertising and an object name is changed.

FIG. 13 is a diagram showing another example of a method for changing an object and searching for a changed object using an action control point (OACP) in the BLE technology proposed in this specification.

Referring to FIG. 13, the server device sends an advertising message to the client device in order to notify the client device of the provision of an object transfer service (S1310). The advertising message may include service information (including a service name) provided by the server device, the name of the server device, and manufacturer data.

Thereafter, the client device sends a connect request message to the server device in order to establish a Bluetooth communication connection (S1320).

The Bluetooth communication connection is established between the server device and the client device through step S1320.

Thereafter, the client device sends OACP information, including an Op Code Value field indicative of a change of the name of an object managed by the server device to the name of a new object, to the server device. An example in which the name of an object is changed is described below.

In this case, the Op Code value field may be the "Write" operation." For detailed contents of the OACP, reference is made to Table 12.

Thereafter, the server device changes the name of the object based on the received OACP information, that is, a "Write request" from the client device (S1340).

Thereafter, the server device sends data changed indication information, including object identification information indicating that "Object ID=1" has been newly generated or that an object is a changed object, to the client device (S1350). That is, if the name of an object is changed, the server device notifies the client device that a change of the object has been generated by indicating the changed object through the name of the changed object or the ID of the changed object.

In this case, if a change of the object name is recognized, the server device sends the object identification information indicative of the name of the changed object to all of client devices connected to the server device.

Thereafter, the client device changes an (object) List Filter Characteristics value using the OACP in order to search for an object indicated by the data changed indication information.

That is, the client device sends OACP information, including (Op Code value) information indicative of a change to an (object) List Filter value having Object ID=1, to the server device so that the server device provides only objects each having Object ID=1 (S1360).

Thereafter, the server device provides an object list of the objects each having Object ID=1 (S1370).

Furthermore, the drawings have been divided and described for convenience of description, but the embodiments described with reference to the drawings may be merged to implement a new embodiment. Furthermore, the scope of the present invention includes the design of a computer-readable recording medium on which a program for executing the aforementioned embodiments has been recorded depending on the needs of those skilled in the art.

The methods for providing an object transfer service according to this specification are not limited and applied to the configurations and methods of the aforementioned embodiments, but the embodiments may be constructed by selectively combining some of or all of the embodiments so that they are modified in various ways.

The method for providing an object transfer service according to this specification may be implemented in a recording medium, readable by a processor included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the recording medium includes an implementation in the form of carrier waves, such as transmission through the Internet. Furthermore, the processor-readable recording medium may be distributed over computer systems connected over a network, and the processor-readable code may be stored and executed in a distributed manner.

Furthermore, although some embodiments of this specification have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

Furthermore, in this specification, both the device invention and the method invention have been described, but the descriptions of both the inventions may be supplementarily applied, if necessary.

INDUSTRIAL APPLICABILITY

This specification provides a method for transmitting data or object-related data using a BLE technology, that is, a short-distance low energy wireless technology.

The invention claimed is:

1. A method for performing communication using Bluetooth low energy (BLE) in a wireless communication system comprising a server device and a client device, the method performed by the client device and comprising:
   receiving an advertising message transmitted from the server device to establish a connection with a nearby device,
   wherein the advertising message includes object transfer service-related information;
   transmitting a scan request message for obtaining additional information to the server device;
   receiving a scan response message from the server device as a response to the scan request;
   transmitting a connect request message to the server device in order establish a Bluetooth communication connection with the server device;
   receiving, from the server device, object changed indication information comprising an identifier (ID) of an object that is changed and generation flag information indicating whether a new object or data has been created, when the change of the object is generated in the server device; and
   transmitting an object list control point (OLCP) including an operation code (Op Code) indicating an operation of designating an object having a specific object ID as a current object in an object list of the server device.

2. The method of claim 1, further comprising:
   transmitting an object request message to the server device in order to request the current object.

3. The method of claim 1, further comprising:
   receiving object filter information comprising an object list of only objects marked by a marking type indicative of object characteristics from the server device.

4. The method of claim 3, further comprising:
   transmitting operation code (Op code) information indicating a change of a marked object value of an object list to the server device.

5. The method of claim 1, further comprising:
   transmitting operation code (Op code) information indicating a change of a marked object value of the object list to the server device.

6. The method of claim 5, wherein the Op Code information is included in object list control point (OLCP) information or object action control point (OACP) information and transmitted.

7. The method claim 1, wherein the object changed indication information further comprises event generation time information indicative of a time when the change of the object is generated.

8. The method of claim 7, further comprising:
   searching for the changed object based on the received event generation time information.

9. A client device performing communication with a server device using Bluetooth low energy (BLE) in a wireless communication system, the client device comprising:
   a communication unit configured to perform communication with an outside in a wireless or wired manner; and
   a processor operatively connected to the communication unit,
   wherein the processor controls the communication unit so that the communication unit receives an advertising message transmitted from the server device to establish a connection with a nearby device, the advertising message including object transfer service-related information,
   controls the communication unit so that the communication unit sends a scan request message tor obtaining additional information to the server device and receives a scan response message from the server device as a response to the scan request,
   controls the communication unit so that the communication unit sends a connect request message to the server device in order to establish a Bluetooth communication connection with the server device,
   controls the communication unit so that the communication unit receives, from the server device, object changed indication information comprising an identifier (ID) of an object that is changed and generation flag information indicating whether a new object or data has been created, when the change of the object is generated in the service device, and
   controls the communication unit so that the communication unit transmits an object list control point (OLCP) including an operation code (Op Code) indicating an operation of designating an object having a specific object ID as a current object in an object list of the server device.

10. The client device of claim 9, wherein the processor controls the communication unit so that the communication unit receives object filter information comprising an object list of only objects marked by a marking type indicative of object characteristics from the server device.

11. The client device of claim 10, wherein the processor controls the communication unit so that the communication unit sends operation code (Op code) information indicating a change of a marked object value of an object list to the server device.

12. The client device of claim 9, wherein the processor controls the communication unit so that the communication unit sends operation code (Op code) information indicating a change of a marked object value of the object list to the server device.

13. A method for performing communication using Bluetooth low energy (BLE) in a wireless communication system comprising a server device and a client device, the method performed by the server device and comprising:
   transmitting an advertising message to establish a connection with a nearby device,
   wherein the advertising message includes object transfer service-related information;
   receiving a scan request message for obtaining additional information from the client device;
   transmitting a scan response message to the client device as a response to the scan request;
   receiving a connect request message from the client device in order to establish a Bluetooth communication connection with the client device;
   transmitting, to the client device, object changed indication information comprising an identifier (ID) of an object that is changed and generation flag, information indicating whether a new object or data has been created, when the change of the object is generated in the server device; and
   receiving an object list control point (OLCP) including an operation code (Op Code) indicating an operation of designating an object having a specific object ID as a current object in an object list of the server device.

* * * * *